May 20, 1958 E. G. PERRY 2,835,362

REDUCTION OF HYSTERESIS IN MAGNETIC CLUTCHES

Filed May 1, 1953

INVENTOR
Edward Gordon Perry

BY Stevens, Davis, Miller & Mosher
ATTORNEYS

United States Patent Office 2,835,362

Patented May 20, 1958

2,835,362

REDUCTION OF HYSTERESIS IN MAGNETIC CLUTCHES

Edward Gordon Perry, Dallas, Tex., assignor to Texas Instruments Incorporated, Dallas, Tex., a corporation of Delaware Application May 1, 1953, Serial No. 352,419

6 Claims. (Cl. 192—21.5)

This invention relates to an improved means for reducing the hysteresis effects in magnetic circuits and is a continuation-in-part of application, Serial No. 248,732, filed on September 28, 1951, now Patent No. 2,769,142.

The former application discloses an electrical recorder movement which consists, generally, of a pair of magnetic clutches arranged in a push-pull relationship. A single operating coil is employed with two magnetic clutches and the parts are assembled with the operating coil located on a stationary part of the overall construction. While the foregoing arrangement can be operated very successfully, nevertheless, there are various hysteresis effects which tend to produce errors in the operation of the clutches which should be reduced as much as possible.

The phenomenon known as hysteresis is the characteristic property of a magnetically permeable material to retain a residual magnetism or to oppose a change in its magnetic state. According to the domain theory of magnetism, any material having magnetic properties such as a ferromagnetic material can be considered as being composed of many small domains. Domains when used in this sense are tiny magnetized regions within the crystal-lattice structure of the material. Each of the domains is, in itself, completely magnetized. However, the crystal structure as a whole may or may not be magnetized, depending upon the resultant of the directions of the domain magnetic moments. Thus, if the domain magnetic moments lie in random directions and the resultant of these moments is zero over a whole crystal, then the crystal, as a whole, will be unmagnetized.

When a gradually increasing magnetizing force is applied to an initially unmagnetized ferromagnetic material, it passes through three stages of magnetization. The first stage occurs after a small magnetizing force has been applied. In the first stage the material is characterized by a slight increase in the size of the domains whose moments are most nearly parallel to the applied field. This slight increase in size of the domains occurs usually at the expense of the size of neighboring domains. The magnetization curve of flux versus magnetizing force increases slightly but smoothly through the first stage but rises sharply during the second stage as groups of domains with their axes of spin most nearly parallel to the increased applied field suddenly become aligned. The curve of the third stage levels off and as all the domain axes of spin line up with the field, the ferromagnetic material becomes saturated. Thereafter, as the magnetizing force is reduced to zero, the flux curve accordingly falls but does not quite return to zero, indicating that some of the domain moments are still aligned in the direction in which the field was applied. The flux density remaining in the material is known as remanence, unless the material is being symmetrically cyclically magnetized. In this case, the flux density for the condition of zero magnetizing force is called the residual flux density. The flux density affecting the clutch or its magnetic path may be due to either type of magnetizing force remanence or residual flux density. This remanence or residual flux density requires the application of a coercive force to reduce the residual flux to zero; that is, a force of sufficient magnitude in the opposite direction to the initial magnetizing force.

Flux is dependent generally upon two factors, namely, the magnetizing force and the reluctance in the circuit. The relationship between these two factors expressed proportionally is that the flux is equal to the magnitizing force divided by the reluctance. Consequently, as the reluctance increases, the flux decreases, if the magnetizing force is held constant. If a signal is applied to a circuit having the characteristic of a low reluctance, flux will be high and the magnetic material will be magnetized to a high point on the hysteresis curve. When the signal is removed, the flux density will not recede to zero but a residual flux density will remain. This residual flux density remaining will either subtract from or add to the flux produced by the next signal applied to the circuit. Either situation will result in an erroneous measurement by the clutch, but the sensitivity of the clutch will remain unimpaired. Sensitivity is considered as the magnetizing force required to magnetize iron particles in a clutch working gap. Conversely, if the reluctance of the path is high, the hysteresis effect of the remaining flux density will be lower but the sensitivity will be decreased also. The problem is, therefore, to balance the two adverse effects of hysteresis and sensitivity to give the required sensitivity with as low hysteresis as possible.

If the clutch arrangement is being used as a meter movement it will be perfectly apparent that the hysteresis in the magnetic circuit to the clutch or in the clutch itself will aid or oppose applied signals to the clutches and will cause the magnetic fluid or magnetic particles in the working gap of the clutch to become magnetized and indicate a signal when none is being applied. Hence, the hysteresis effects can lead to erroneous measurements and impair substantially the accuracy of the meter movement. Further, the hysteresis effect in a clutch arrangement being used as a meter movement can also materially affect the commercial salability of the recorder. Considering, for instance, a pen type chart recorder, an adverse commercial effect would occur if the recorder after indicating a signal failed to center the pen on the chart centerline.

Accordingly, it is an object of the present invention to reduce the hysteresis effects in magnetic circuits leading to clutches arranged in the manner above described while maintaining substantially the same flux in the clutch so that the sensitivity in the clutch will not be greatly affected.

It is a further object of the present invention to provide an improvement to the clutch arrangement as above described that will eliminate erroneous measurements in said clutch arrangement.

It is a still further object of the present invention to provide an improvement to a clutch arrangement as above described that will permit the clutch to operate more efficiently, effectively, and accurately than it would operate without such improvement.

Other and further objects of this invention will become apparent from a detailed consideration of the following description when taken in conjunction with the drawings in which.

Figures 1, 2, 4:
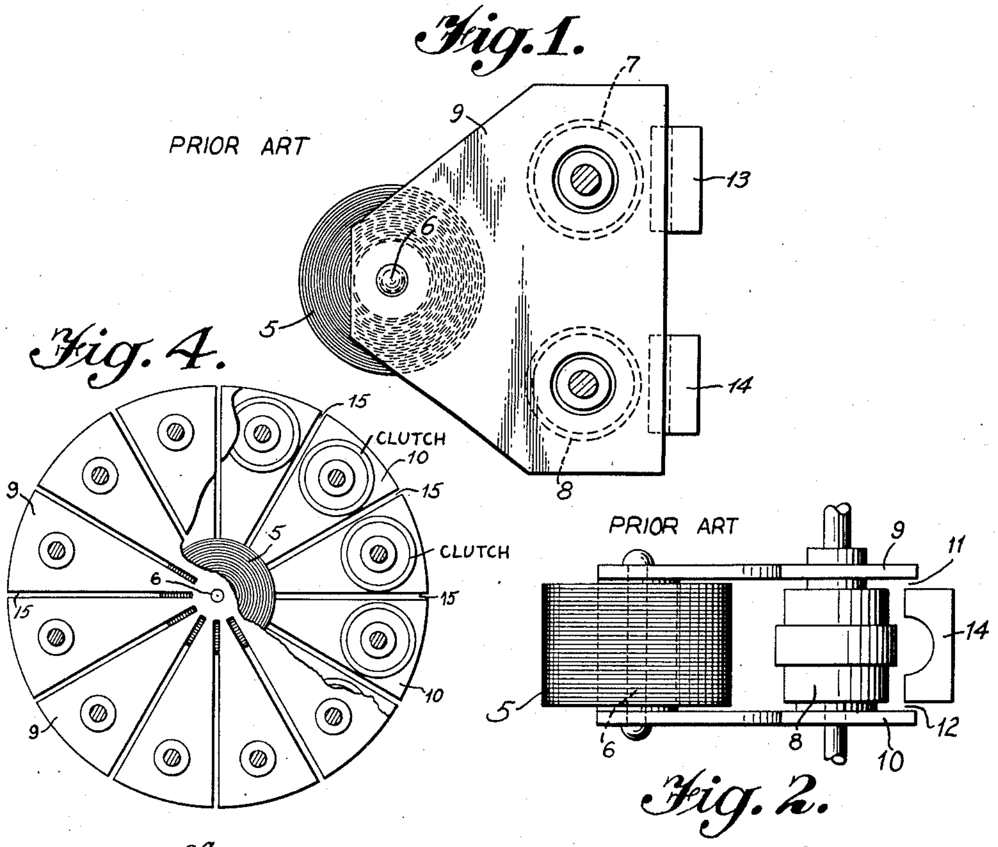
Figure 1 is a top plan view of a typical clutch arrangement to which the improvements of the present invention apply.
Figure 2 is a view in side elevation of the arrangement shown in Figure 1.
Figure 4 illustrates six pairs of clutches arranged about a common coil.

Referring now to the drawings, Figure 1 and Figure 2 show a general clutch arrangement of the type to which the improvements of the present invention apply. As shown, single signal coil 5 is wound about a magnetic field core 6. A pair of clutches 7 and 8 mounted between a top plate 9 and a bottom plate 10 and separated therefrom by air gaps 11 and 12, respectively, receive magnetic signals from the field coil and core. The clutches 7 and 8 are of the magnetic type and can have either magnetic particles or a magnetic fluid in their working gaps. Each of the clutches is mounted between the two core plates 9 and 10 by suitable bearing arrangements (not shown) which are entirely conventional in this art. The core 6 is bolted to the core plates 9 and 10 as shown. The output shafts of the two clutches 7 and 8 are connected together in a push-pull arrangement as described in the copending patent application Serial No. 248,732, filed on September 28, 1951. Thus, the two magnetic clutches 7 and 8 are operated by signals applied to the signal coil 5 which induce a flux that passes through the magnetic circuit composed of the signal coil 5, the magnetic field core 6, core plates 9 and 10, and the clutches 7 and 8. Permanent magnets 13 and 14 are mounted in close proximity to the clutches 7 and 8. The specific mounting structure for these permanent magnets is not shown, however, it will be appreciated that any conventional type mounting can be utilized for these permanent magnets. Thus, as shown in Figures 1 and 2, the magnetic circuit is a parallel circuit in which the total flux generated by the signal coil 5 divides equally between the clutches 7 and 8.

Prior to copending application Serial No. 248,732, filed September 28, 1951, the practice in clutch construction was to mount the signal coil within the clutch housing. Since the clutch housing was rotated by an external source of power, it was necessary to apply signals to the field coil through collector rings. This method caused difficulties and inaccuracies by reason of changes in the resistance of the slip ring construction. The feature of forming the signal coil as a part of the stationary magnetic circuit with the circuit completed through the rotating clutch constituted a major improvement in clutch design for the reason that the rotating clutch caused no significant change in flux through the clutch. The clutch and magnetic path package arrangement of the prior application is compact, rugged, and yet critical dimensions such as air gaps can be accurately maintained. One of the biggest advantages in using the stationary path formed by the plates 9 and 10 is the equal reluctance in the flux path to each of the clutches 7 and 8.

Figure 3:
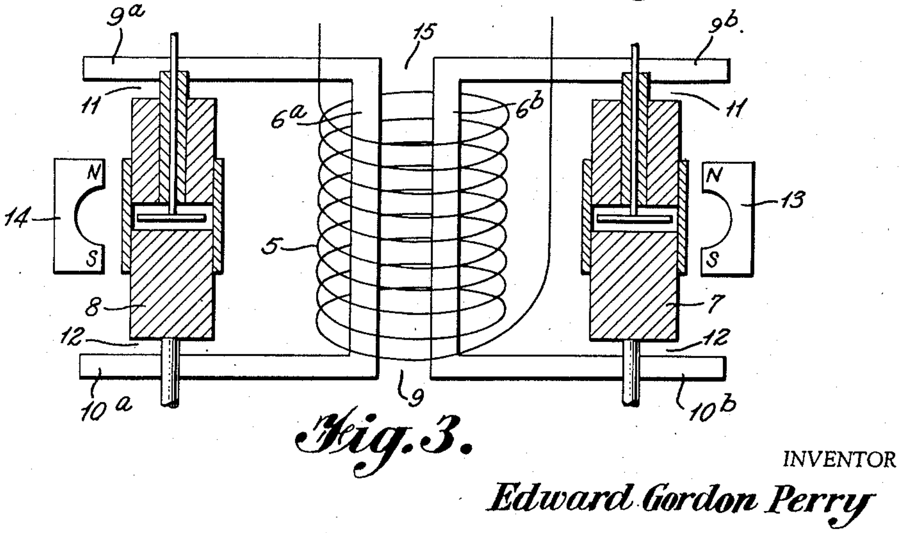
Figure 3 is a schematic representation of the clutch arrangement of Figure 1 showing exactly how the improvements of the present invention apply.

The improvements of the present invention to the clutch arrangement shown in Figure 1 and Figure 2 are illustrated schematically in Figure 3. In all three figures, corresponding or equivalent parts have been given the same number although some numbers in Figure 3 are subdivided by a subscript added to the number. This will serve to indicate which parts of the clutch arrangement shown in Figures 1 and 2 have been modified. The present invention contemplates making the stationary structure in two separate magnetic circuits by dividing the top plate 9 into two equal halves, *9a* and *9b*, the bottom plate 10 into two equal halves, *10a* and *10b*, and replacing the core 6 by two cores *6a* and *6b* to provide one for each circuit. A high reluctance air gap 15 separates the two circuits but a common signal coil 5 surrounds the cores *6a* and *6b*.

The above separations are the only physical changes made to the magnetic circuits shown in Figures 1 and 2. The division into two separate circuits makes only slight magnetic changes other than to the path reluctance in each of the individual circuits which is doubled over that in the undivided parallel magnetic circuit. In principle it is very analogous to an electrical circuit with two equal resistances in parallel; the resistance of such a parallel circuit is one-half the resistance of each individual resistance. This is true since the magnetizing force and flux in each of the individual circuits is maintained substantially constant. Therefore, the reluctance is doubled over the reluctance in the undivided parallel magnetic circuit. Since the signal coil, cross-sectional area of each of the paths, and the air gaps remain unchanged, the flux through each clutch and therefore the sensitivity of the clutch is only slightly affected by doubling the reluctance of the paths.

Both the plates and the core of the path are formed from a highly permeable material having a high flux carrying capacity and characterized by a low reluctance. Although this material makes a very poor permanent magnet, the flux density due to hysteresis is sufficient to affect the accuracy of the clutches, if they are being used as a meter movement. If the reluctance of the path is increased, a given magnetizing force will tend to produce less total flux in each individual path and consequently the hysteresis effect on the accuracy of the meter movement will accordingly be decreased.

Another distinction between the parallel magnetic path that is the undivided magnetic path and the path divided into two individual circuits, is the "keeper" effect on flux density. The "keeper" effect can be best illustrated by considering a magnetic circuit with a short air gap which is temporarily bridged by a piece of soft iron. After a magnetizing current is passed through the circuit and removed, a certain flux density will remain as long as the circuit is completed by the soft iron bridge. When the bridge is removed, however, flux density is reduced until the magnetic potential rise in the magnet equals the magnetic potential drop across the air gap; it being understood in this instance that the reluctance across the air gap has increased materially over what it formerly was with the soft iron bridge in place. The parallel circuit does not have an air gap as do the two individual circuits and neither arrangement employs a temporary bridge. However, relatively speaking, the parallel circuit, that is the undivided circuit, is more effective as a "keeper" than either of the individual circuits. Thus, the greater reluctance of the individual circuits creates a greater potential drop causing a correspondingly lower flux density than is present in the undivided parallel magnetic circuit. The lower flux density in the individual circuits and the consequent improvement in the meter movement accuracy is due both to the increased reluctance in each of the individual circuits and to less effective "keeper" action of the individual circuits.

Permanent magnets 13 and 14 have been shown in all three of the figures. These permanent magnets serve many useful functions in connection with push-pull meter movements, as for example, to provide a bias current to operate the clutches in a linear portion of the torque versus current curve, to form magnetic seals, to eliminate hysteresis in clutches, and to stabilize the iron powder in the magnetic fluids when not in use. Each of the above enumerated functions can be performed with the permanent magnets 13 and 14 by their being used in the manner shown in the figures.

Although the present invention has been shown and described with reference to a pair of clutches receiving their signals from a common coil, it is within the purview of this invention to use two or more pairs of clutches with a common coil. By appropriately changing the shape of the flux path members 9 and 10 and enlarging coil 5, the structure of Figures 1 to 3 for each pair of clutches can be duplicated. Due to physical considerations the number of pairs of clutches that can be used in such an arrangement will probably be limited to about four pairs, or at the most, to about six pairs. Such an arrangement is illustrated in Figure 4 wherein six pairs of clutches are grouped about a common coil 5 between flux path members 9 and 10 which are divided into segments by the high reluctance air gaps 15 defined between adjacent clutches. A use to which this arrangement could be put would be in a servo-mechanism with each pair of clutches having different operating characteristics; thus, for the same signal, each pair of clutches would have a different output. The flux path characteristics, the width of the air gaps, and the strength of the bias magnets are examples of properties that can be varied to alter the clutch operating characteristics.

While the present invention has been described in a single embodiment, nevertheless, various changes and modifications obvious to one skilled in the art are within the spirit, scope and contemplation of the present invention.

What is claimed is:

1. In a magnetic clutch arrangement including a pair of magnetic clutches of the fixed working gap type mounted in a stationary magnetic path formed by a pair of core plates, a core mounted between said core plates, and a coil wound on said core the improvement that comprises said core and core plates being split into two parts and high reluctance means separating the parts of said core and core plates.

2. In a magnetic clutch arrangement including a pair of magnetic clutches of the fixed working gap type mounted in a stationary magnetic path formed by a pair of core plates, a core mounted between said core plates, and a coil wound on said core the improvement that comprises said core and core plates being split into two parts and a high reluctance air gap separating the parts of said core and core plates.

3. A novel magnetic clutch arrangement that comprises means defining a pair of stationary magnetic paths, a core connected to one end of each of said means defining said stationary magnetic paths, a coil wound on said core, and a plurality of magnetic clutches of the fixed working gap type mounted between the other ends of said means defining said stationary magnetic paths and separated therefrom by air gaps.

4. A novel clutch arrangement as defined in claim 3 wherein said plurality of clutches are arranged in pairs with each pair having different operating characteristics.

5. A novel clutch arrangement as defined in claim 4 wherein each portion of said pair of stationary magnetic paths associated with a pair of clutches is split by a high reluctance air gap.

6. In a magnetic clutch arrangement including a pair of magnetic clutches of the fixed working gap type each mounted in a stationary magnetic path formed by a low reluctance means, and a coil wound upon at least a section of the low reluctance means, the improvement that comprises said low reluctance means being split into two parts, each part of said low reluctance means defining a low reluctance path to a separate one of said magnetic clutches, and a high reluctance means separating the parts of said low reluctance means.

References Cited in the file of this patent

UNITED STATES PATENTS

| | | |
|---|---|---|
| 535,511 | Sperry | Mar. 12, 1895 |
| 767,703 | Levison | Aug. 16, 1904 |
| 2,411,055 | Rich | Nov. 12, 1946 |
| 2,732,725 | Brueder | Jan. 31, 1956 |

FOREIGN PATENTS

| | | |
|---|---|---|
| 63,531 | Denmark | May 14, 1945 |